United States Patent [19]

Kuwana et al.

[11] Patent Number: 4,834,468

[45] Date of Patent: May 30, 1989

[54] ANTISKID APPARATUS

[75] Inventors: Kazutaka Kuwana, Toyota; Hiromu Kuromitsu, Chiryu; Hiroaki Takeuchi; Nobuyasu Nakanishi, both of Toyota; Tomohiko Hosoda, Nagoya, all of Japan

[73] Assignees: Aisin Seiki Kabushiki Kaisha, Kariya; Toyota Jidosha Kabushiki Kaisha, Toyota, both of Japan

[21] Appl. No.: 99,728

[22] Filed: Sep. 22, 1987

[30] Foreign Application Priority Data

Sep. 22, 1986 [JP] Japan .................. 61-224183

[51] Int. Cl.$^4$ .......................... B60T 8/40; B60T 13/68
[52] U.S. Cl. .................... 303/116; 303/119; 60/591
[58] Field of Search ................. 303/6 A, 6 R, 52, 54, 303/59, 60, 84 A, 93, 110, 113, 114, 115, 116, 117, 119, 6.01; 188/181 A; 60/547.1, 591

[56] References Cited

U.S. PATENT DOCUMENTS

| | | | |
|---|---|---|---|
| 3,431,028 | 3/1969 | Yoder | 188/349 |
| 3,521,934 | 7/1970 | Leiber . | |
| 3,659,905 | 5/1972 | Goulish | 303/114 |
| 3,722,960 | 3/1973 | Von Lonis of Menar | 303/115 |
| 3,746,402 | 7/1973 | Hickner et al. | 303/115 |
| 3,753,600 | 8/1973 | Gemmellaro | 303/119 |
| 3,787,094 | 1/1974 | Harned et al. | 303/113 |
| 3,801,161 | 4/1974 | Sharp | 303/116 |
| 3,844,623 | 10/1974 | Parsans et al. | 303/119 |
| 3,848,934 | 11/1974 | Grosseau | 303/119 |
| 3,877,756 | 4/1975 | Ihada et al. | 303/114 |
| 3,905,655 | 5/1974 | de Gennes | 303/119 |
| 3,975,061 | 8/1976 | Kondo et al. | 303/68 X |

(List continued on next page.)

FOREIGN PATENT DOCUMENTS

| | | |
|---|---|---|
| 2363619 | 7/1974 | Fed. Rep. of Germany . |
| 2444765 | 4/1976 | Fed. Rep. of Germany ...... 303/116 |
| 2519835 | 11/1976 | Fed. Rep. of Germany . |
| 3420687 | 12/1985 | Fed. Rep. of Germany ..... 60/547.1 |
| 0028944 | 8/1971 | Japan .................. 137/514.5 |
| 49-28307 | 7/1974 | Japan . |
| 56-142733 | 11/1981 | Japan . |
| 58-199258 | 11/1983 | Japan . |
| 60-25834 | 2/1985 | Japan . |
| 60-25835 | 2/1985 | Japan . |
| 0071359 | 4/1985 | Japan .................. 303/116 |
| 61-222850 | 10/1986 | Japan . |
| 62-187638 | 8/1987 | Japan . |
| 62-187640 | 8/1987 | Japan . |
| 62-191260 | 8/1987 | Japan . |
| 2056606 | 2/1980 | United Kingdom ............. 303/116 |
| 2141195A | 12/1984 | United Kingdom . |
| 2168771A | 6/1986 | United Kingdom . |
| 2175362A | 11/1986 | United Kingdom . |

OTHER PUBLICATIONS

Heinz Leiber et al., "Antilock System for Passenger Car with Digital Electronics—Design and Operation", 1979.

Primary Examiner—Andres Kashnikow
Assistant Examiner—Timothy Newholm
Attorney, Agent, or Firm—Burns, Doane, Swecker & Mathis

[57] ABSTRACT

The present invention relates an antiskid apparatus for an automotive vehicle. The apparatus includes a cut-off valve which is connected between a master cylinder and a wheel cylinder and provides communication therebetween in response to wheel cylinder pressure and cuts off pressurized hydraulic fluid from the master cylinder when an antiskid operation is performed by the control system. A solenoid valve is positioned in a conduit which connects the wheel cylinder to the cut-off valve. The solenoid valve is also connected to a discharge side of a pump which circulates pressurized oil. When the solenoid is in a normal position, the wheel cylinder is connected to the cut-off valve in the discharge side of the pump. When changed over from the normal position, the solenoid valve disconnects the wheel cylinder from the cut-off valve and the discharge side of the pump and connects the wheel cylinder to a reservoir connected to an intake side of the pump.

4 Claims, 2 Drawing Sheets

U.S. PATENT DOCUMENTS

| | | | |
|---|---|---|---|
| 4,036,534 | 7/1977 | Kondo et al. | 303/115 |
| 4,050,748 | 9/1977 | Belart | 303/114 |
| 4,116,495 | 9/1978 | Belart | 303/116 |
| 4,129,341 | 12/1978 | Pauwels | 303/115 X |
| 4,138,165 | 2/1979 | Blomberg et al. | 303/61 X |
| 4,415,210 | 11/1983 | Belart et al. | 303/116 |
| 4,453,782 | 6/1984 | Arikawa et al. | 303/116 |
| 4,492,414 | 1/1985 | Kozakai et al. | 303/115 X |
| 4,526,426 | 7/1985 | Sato et al. | 303/115 |
| 4,552,413 | 11/1985 | Fujii et al. | |
| 4,578,951 | 4/1986 | Belart et al. | 303/119 X |
| 4,597,611 | 7/1986 | Nishimura et al. | |
| 4,602,824 | 7/1986 | Nishimura et al. | |
| 4,605,263 | 8/1986 | Ando et al. | |
| 4,618,189 | 10/1986 | Nakanishi et al. | |
| 4,620,750 | 11/1986 | Leiber | 60/591 |
| 4,624,508 | 11/1986 | Adachi et al. | |
| 4,636,008 | 1/1987 | Adachi et al. | |
| 4,636,101 | 1/1987 | Adachi et al. | |
| 4,641,895 | 2/1987 | Belart et al. | 60/547.1 |
| 4,652,061 | 3/1987 | Nishimura et al. | 303/116 |
| 4,655,509 | 4/1987 | Ando et al. | |
| 4,660,899 | 4/1987 | Ando et al. | |
| 4,674,805 | 6/1977 | Leiber | 303/114 |
| 4,678,243 | 7/1987 | Leiber | 303/119 |
| 4,685,747 | 8/1987 | Belart et al. | 303/114 |
| 4,703,979 | 11/1987 | Nakanishi et al. | 303/119 X |
| 4,715,666 | 12/1987 | Farr | 303/117 X |
| 4,728,155 | 3/1988 | Resch | 303/114 |
| 4,730,879 | 3/1988 | Adachi et al. | 303/116 |
| 4,750,329 | 6/1988 | Horiuchi et al. | 303/114 |
| 4,750,788 | 6/1988 | Seibert et al. | 303/119 X |
| 4,754,605 | 7/1988 | Seibert et al. | 60/591 |

ANTISKID APPARATUS

BACKGROUND

This invention relates to an antiskid apparatus for automotive vehicles.

An example of a conventional antiskid apparatus for automotive vehicles is disclosed in the specification of Japanese Patent Publication (KOKOKU) No. 49-28307.

As shown in FIG. 2, the conventional antiskid apparatus has an inlet solenoid valve 3 arranged between a master cylinder 1 and a wheel brake 2, and an outlet solenoid valve 5 arranged between the wheel brake 2 and a reservoir 4. A pump 6 is arranged between the reservoir 4 and the master cylinder 1 and the circuit arrangement is such that a working fluid discharged from the pump 6 circulates to the master cylinder 1 and inlet solenoid valve 3.

Thus, the circuit arrangement is such that the working fluid is circulated between the master cylinder 1 and inlet solenoid valve 3 in the conventional antiskid apparatus. Consequently, when the inlet solenoid valve 3 is cut off during operation of the antiskid function, the fluid pressure increases between the inlet solenoid valve 3 and pump 6 when there is an increase in pressure at the wheel brake 2. Since the fluid pressure is applied directly to the master cylinder 1, the brake pedal 7 is forced backward. When there is a decrease in pressure at the wheel brake 2, the fluid pressure between the inlet solenoid valve 3 and pump 6 decreases, as a result of which the pedal 7 is drawn inward. Owing to repetition of this phenomenon, a large pedal shock is produced and the driver is subjected to discomfort and unease.

SUMMARY OF THE DISCLOSURE

The present invention seeks to eliminate the aforementioned drawback of the prior-art antiskid apparatus and its object is to provide a novel antiskid apparatus capable of preventing pedal shock during the antiskid operation.

According to the present invention, the foregoing object is attained by providing an antiskid apparatus for an automotive vehicle comprising:

a master cylinder;

a wheep cylinder;

a cut-off valve connected to said master cylinder and wheel cylinder for communicating said master cylinder and wheel cylinder in response to wheel cylinder pressure and for cutting off pressurized oil from said master cylinder when an antiskid operation is performed;

a regulator valve which operates with master cylinder pressure serving as a control signal pressure;

a pump for circulating pressurized oil to said regulator valve and having a discharge side connected to a line between said cut-off valve and the wheel cylinder;

a reservoir connected to an intake side of said pump; and a solenoid valve arranged in a line connecting said wheel cylinder to said cut-off valve and a discharge side of said pump for connecting said wheel cylinder to said cut-off valve and the discharge side of said pump when said solenoid valve is in a normal position and, when changed over from the normal position, for disconnecting said wheel cylinder from said cut-off valve and the discharge side of said pump and connecting said wheel cylinder to said reservoir.

In an embodiment of the invention, the cut-off valve and the regulator valve are integrally formed.

In operation, the cut-off valve brings the master cylinder and wheel cylinder into communication in response to the wheel cylinder pressure when the vehicle is traveling in on ordinary fashion. When the driver steps down on the brake pedal, pressurized oil is supplied to the wheel cylinder from the master cylinder so that a braking force is applied.

In operation of the antiskid function, the solenoid valve is changed over to terminate the communication between the master cylinder and wheel cylinder and connect the wheel cylinder to the reservoir, whereby pressurized oil from the wheel cylinder is discharged into the reservoir to reduce the wheel cylinder pressure and thus weaken the braking force. At the same time, the cut-off valve cuts off the master cylinder pressure as the wheel cylinder pressure decreases.

As for the pump pressure, this is regulated in response to the master cylinder pressure as a control signal pressure by the regulator valve formed integral with the cut-off valve. At operation of the antiskid system, oil pressure conforming to the master cylinder pressure is applied to the wheel cylinder by changeover of the solenoid valve. At this time the oil pressure from the pump is supplied to a point in a line between the cut-off valve and the wheel cylinder downstream of the cut-off valve, and the master cylinder is in the cut-off state due to the cut-off valve. As a result, the oil pressure from the pump is not applied to the master cylinder and, hence, pedal shock is not produced. Excess oil from the pump is discharged into the reservoir so that the pump pressure does not become abnormally high.

When the wheel cylinder pressure rises up to the pump pressure, the cut-off valve again communicates the master cylinder and the wheel cylinder in response to the wheel cylinder pressure, thereby ending the antiskid operation and restoring braking performed by the master cylinder.

The antiskid apparatus of the invention has a number of advantages. Specifically, since the pressurized oil from the pump is supplied to the wheel cylinder downstream of the cut-off valve and the communication between the pump and master cylinder is cut off by the cut-off valve at the antiskid operation, there is absolutely no risk of pedal shock produced by the pump pressure. In addition, one of two solenoid valves used in the conventional arrangement can be replaced by an inexpensive cut-off valve, thereby lowering the cost of manufacture.

Further, by providing the regulator valve, pump energy is utilized effectively without waste, thus making it possible to save energy. Moreover, if the regulator valve and the cut-off valve are integrated, the overall apparatus can be reduced in size.

Other features and advantages of the present invention will be apparent from the following description taken in conjunction with the accompanying drawings.

DETAILED DESCRIPTION

A preferred embodiment of an antiskid apparatus will now be described with reference to FIG. 1.

Figure 1:
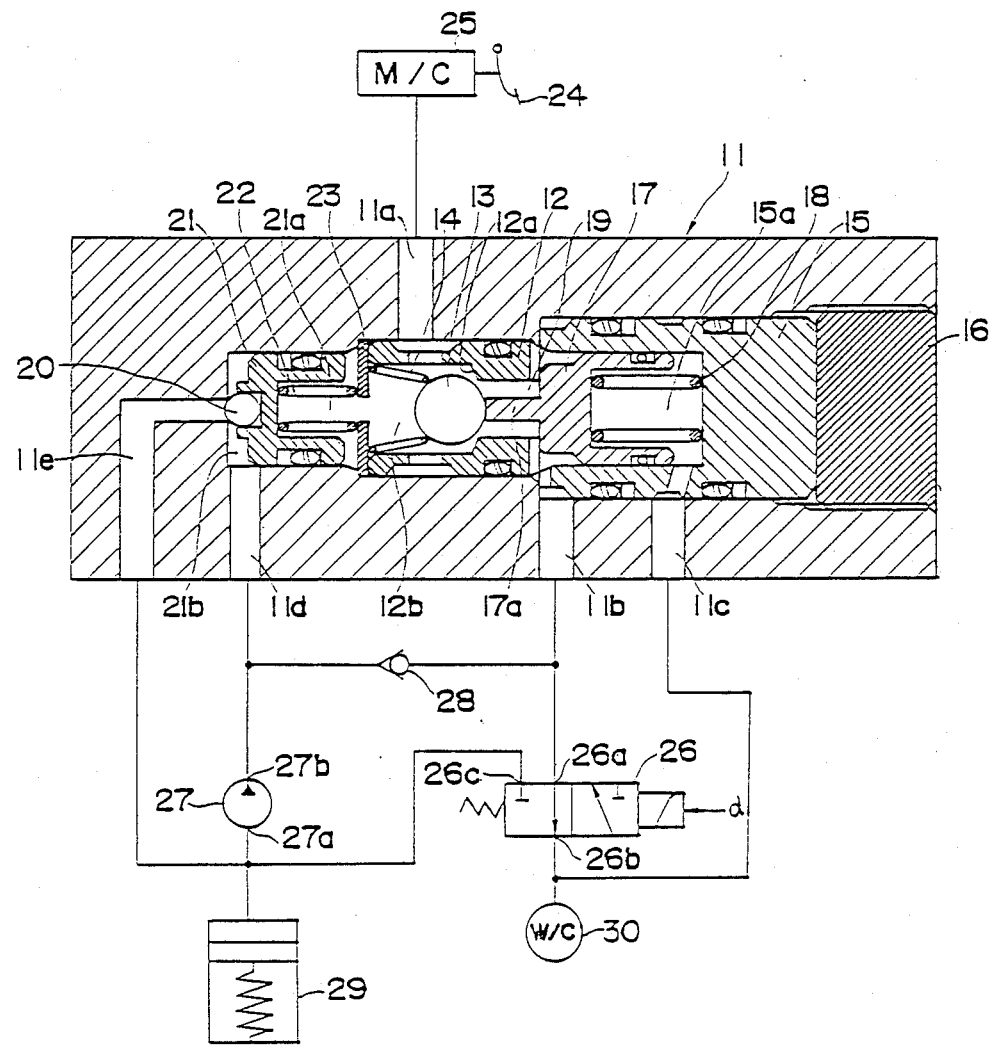
FIG. 1 is a hydraulic circuit diagram illustrating an embodiment of an antiskid apparatus according to the present invention.
Figure 2:
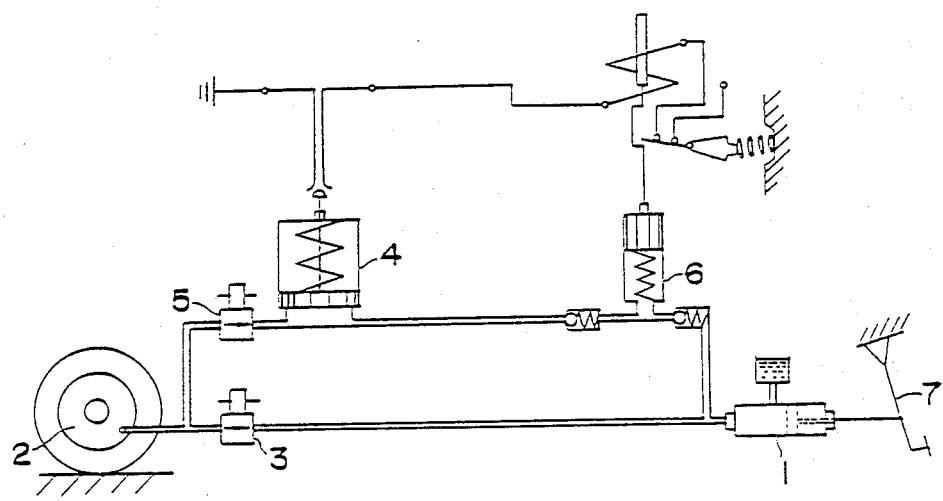
FIG. 2 is a hydraulic circuit diagram illustrating an antiskid apparatus according to the prior art.

As shown in FIG. 1, a valve seat 12 having a valve seat 12a formed on its inner periphery is fixedly fitted into the hollow central interior of the body of a valve 11. Formed within the seat 12 is an oil chamber 12b into which a cut-off ball (valve element) 13 is inserted and urged in the direction of the valve seat 12a (rightward in FIG. 1) by a spring 14. An inlet port 11a communicating with the oil chamber 12b is formed in the body of valve 11.

A cylinder 15 is inserted into the right end of the body of valve 11 and is secured in the hollow central interior of the valve body by a plug 16. A piston 17 is slidably fitted into the cylinder 15. A projection 17a is formed on the piston 17 on the side thereof facing the cut-off ball 13 (i.e. on the left side of the piston in FIG. 1) and is in abutting contact with the ball 13. Formed in the piston 17 on the other side thereof (the right side in FIG. 1) is an oil chamber 15a facing the bottom of the cylinder 15. A spring 18 is loaded in the oil chamber 15a and urges the piston 17 toward the cut-off ball 13 (leftward in FIG. 1)

An oil chamber 19 is formed between the cut-off ball 13 and the piston 17. Communicating with the oil chamber 19 is an outlet port 11b formed in the body of valve 11. Th valve body also has a control port 11c communicating with the oil chamber 15a.

A piston 21 retaining a ball 20 in its distal end (the left end in FIG. 1) is freely slidably inserted, in coaxial relation with the piston 17, in a cylinder formed in the left end portion of the body of valve 11. The piston 21 is urged leftward in FIG. 1 by a spring 22.

A back chamber 21a of the piston 21 and the oil chamber 12b are communicated via the central hole of a washer 23 supporting the spring 22. An oil chamber 21b on the left side of the piston 21 communicates with a pump inlet port 11d and a pump outlet port 11e open to the front side of the ball 20. The ball 20 and an opening on the side of the oil chamber 21b of pump outlet port 11e form a throttle.

A master cylinder 25 having a brake pedal 24 linked thereto is connected to the inlet port 11a of the valve 11. A wheel cylinder 30 is connected to a second port 26b of a solenoid valve 26. Connected to a point of a line between the second port 26b and the wheel cylinder 30 is a control port 11c of the valve 11. The solenoid valve 26 has a third port 26c connected to an intake side 27a of the pump 27.

The pump 27 has a discharge side 27b connected to the pump inlet port 11d of the valve 11 and, further, to a first port 26a of the solenoid valve 26 via a check valve 28. The intake side 27a of the pump 27 is connected to a reservoir 29 and the pump outlet port 11e.

When in the normal position, the solenoid valve 26 communicates the first port 26a and the second port 26b. When changed over, the solenoid valve 26 cuts off the first port 26a and communicates the second port 26b and third port 26c.

The operation of the above-described antiskid apparatus will now be set forth.

When the vehicle is traveling in an ordinary fashion, the piston 17 is urged toward the cut-off ball 13 by the spring 18 and residual pressure in the oil chamber 15a, so that the cut-off ball 13 is separated from the valve seat 12 against the force of the spring 14 by the piston 17. As a result, the oil chambers 12b and 19 are in communication. When the brake pedal 24 is depressed, pressurized oil from the master cylinder 25 is supplied to the wheel cylinder 30 via the inlet port 11a, oil chamber 12b, the clearance between the cut-off ball 13 and valve seat 12a, the oil chamber 19, the outlet port 11b, and the first and second ports 26a, 26b of the solenoid valve 26. A braking force is produced as a result. At this time, pressurized oil from the wheel cylinder 30 is supplied to the oil chamber 15a through the control port 11c, so that the piston 17 is urged in the same direction as the force applied by the spring 18, whereby the oil chambers 12b, 19 are kept in the communicated state.

At the time of antiskid operation, namely when the brake pedal 24 is depressed and a sensor (not shown) senses that lock-up of the vehicle wheels is about to occur at sudden braking, the solenoid valve 26 is changed over by a signal $\alpha$ from a control unit (not shown). As a result, the first port 26a is cut off and the second port 26b and the third port 26c are brought into communication.

Owing to this operation of the solenoid valve 26, the supply of pressurized oil from the master cylinder 25 to the wheel cylinder 30 is cut off and the pressurized oil from the wheel cylinder 30 is discharged into the reservoir 29 via the second and third ports 26b and 26c of the solenoid valve 26. As a result of the drop in the wheel cylinder pressure, the pressure in the oil chamber 15a decreases so that the piston 17 and cut-off ball 13 are slid rightwardly in FIG. 1 under the urging force of the spring 14, allowing the cut-off ball 13 to be brought into pressing contact with the valve seat 12a. The communication between the oil chamber 12b and oil chamber 19 is thereby interrupted, so that the pressurized oil from the master cylinder 25 is cut off. The braking force is weakened by the decline in the wheel cylinder pressure.

Next, when rotation of the vehicle wheels is restored due to the decline in the wheel cylinder pressure, the solenoid valve 26 is returned to the normal position by a signal $\alpha$ from the control unit, thereby bringing the first and second ports 26a and 26b into communication. At this time the cut-off ball 13 continues to cut off the pressurized oil from the master cylinder 25 as long as the following relation between the master cylinder pressure (M/C pressure) and the wheel cylinder pressure (W/C pressure) is maintained: M/C pressure > W/C pressure.

The pressurized oil from the pump 27 is supplied to the wheel cylinder 30 via the chck valve 28 to raise the wheel cylinder pressure slightly. The antiskid operation is achieved by repeating the changeover of the solenoid valve 26 is a state where the master cylinder pressure is cut off by the cut-off ball, thereby causing the wheel cylinder pressure to slightly increase and decrease in repetitive fashion.

Owing to the action of the pump 27 during this antiskid operation, pressurized oil is circulated through the pump 27, pump inlet port 11d, oil chamber 21b, pump outlet port 11e and pump 27, in the order mentioned. The master cylinder pressure from the oil chamber 12b is applied to the back chamber 21a of piston 21, so that the piston 21 is urged in the same direction as the force applied by spring 22. As a result, the amount of pressurized oil flowing from the oil chamber 21b to the pump outlet port 11e is throttled by the ball 20, whereby the pump pressure is set with the master cylinder pressure serving as a control signal pressure. Excess pressurized oil is discharged into the reservoir 29, so that the pump pressure will not become abnormally high.

Since the pump 27 and master cylinder 25 are cut off by the cut-off ball 13 during the antiskid operation, oil pressure from the pump 27 is not applied to the master cylinder 25.

When the wheel cylinder pressure rises up to the pump pressure, the oil pressure internally of the chamber 15a of valve 11 rises due to the wheel cylinder pressure and cooperates with the spring 18 to slide the piston 15 and cut-off ball 13 leftwrdly in FIG. 1 against the force of the spring 14. The cut-off ball 13 parts from the valve seat 12a so that the master cylinder 25 and the wheel cylinder 30 are again communicated, thereby ending the antiskid operation and resuming braking by the master cylinder 25.

In the above-described embodiment, a cut-off valve constituted by the cut-off ball 13 and piston 17, and a regulator valve constituted by the piston 21 and ball 20, are integrally formed in coaxial relation within one and the same casing, and these valves are actuated by master cylinder pressure. This makes it possible to reduce the size of the regulator valve and simplify the hydraulic circuitry.

Further, using the cut-off ball in the cut-off valve enhances reliability and simplifies the valve structure.

As many apparently widely different embodiments of the present invention can be made without departing from the spirit and scope as disclosed and claimed hereinbelow, it is to be understood that the invention is not limited to the specific embodiment thereof except as defined in the appended claims.

What is claimed is:

1. An antiskid apparatus for an automotive vehicle comprising:
    a master cylinder;
    a wheel cylinder;
    a cut-off valve hydraulically connected to said master cylinder, said wheel cylinder and a pump discharge port, said cut-off valve including a valve element, a valve seat associated with the valve element to define first and second chambers and a first piston driving the valve element and disposed in the second chamber, the valve element being disposed in the first chamber receiving master cylinder pressure, the first piston receiving pressure of the wheel cylinder towards separating the valve element from the valve seat, said first piston being urged towards seating said valve element on the valve seat when master cylinder pressure exceeds wheel cylinder pressure, and said valve element being pressed towards seating on the valve seat pressure of said master cylinder when the valve element seats on the valve seat and by spring pressure;
    a regulator valve providing regulated pump pressure operated by pressure of the master cylinder serving as a control signal pressure, said regulator valve having a port hydraulically connected to said discharge port,
    a second valve seat disposed between first and second chambers communicating with said discharge port and said intake port, respectively;
    a second piston disposed movably within a cylinder separating a third chamber communicating with said master cylinder from the first chamber communicating with the discharge port;
    a second valve element associated with said second piston and disposed in the first chamber, said second valve element being urged by the master cylinder pressure towards seating on said second valve seat and urged by the pump pressure towards separating from said second valve seat, so as to form an adjustable throttle between the first and second chambers to produce a resulting regulated pump pressure in the first chamber which is delivered to the second chamber of said cut-off valve and said solenoid valve via said check valve when the regulated pump pressure exceeds the master cylinder pressure;
    a pump having said pump discharge port and further circulating pressurized oil to said regulator valve;
    a reservoir connected to an intake port of said pump, and
    a solenoid valve arranged in a line connecting said wheel cylinder to said cut-off valve and the pump discharge port and in a line connecting said wheel cylinder to said reservoir, said solenoid valve taking a normal position connecting said wheel cylinder to said cut-off valve and the pump discharge port in the absence of skid condition, said solenoid valve alternately taking said normal position and a second position to disconnect said wheel cylinder from both said cut-off valve and the pump discharge port and concurrently connect said wheel cylinder said reservoir,
    wherein the second chamber further communicates with the pump discharge port, via a check valve allowing a flow only from the discharge port and through said solenoid valve with said wheel cylinder, the valve element of the cut-off valve separates from the valve seat when the regulated pump pressure is less than pressure of the wheel cylinder, said valve element being separated from the valve seat by the first piston to communicate said master cylinder to said wheel cylinder in the absence of the skid condition, and being seated on the valve seat to cut off the master cylinder pressure from said wheel cylinder when the antiskid operation is performed.

2. The antiskid apparatus according to claim 1, wherein said second piston is further urged by a spring toward closing the throttle.

3. The antiskid apparatus according to claim 1, wherein said spring is disposed in the third chamber communicated with the first chamber of the cut-off valve receiving the master cylinder pressure.

4. The antiskid apparatus according to claim 1, wherein said cut-off valve and the regulator valve are integrally and coaxially formed.

* * * * *